No. 653,425. Patented July 10, 1900.
C. MOEHRING.
TRANSPLANTER.
(Application filed Sept. 18, 1899.)
(No Model.) 4 Sheets—Sheet 1.
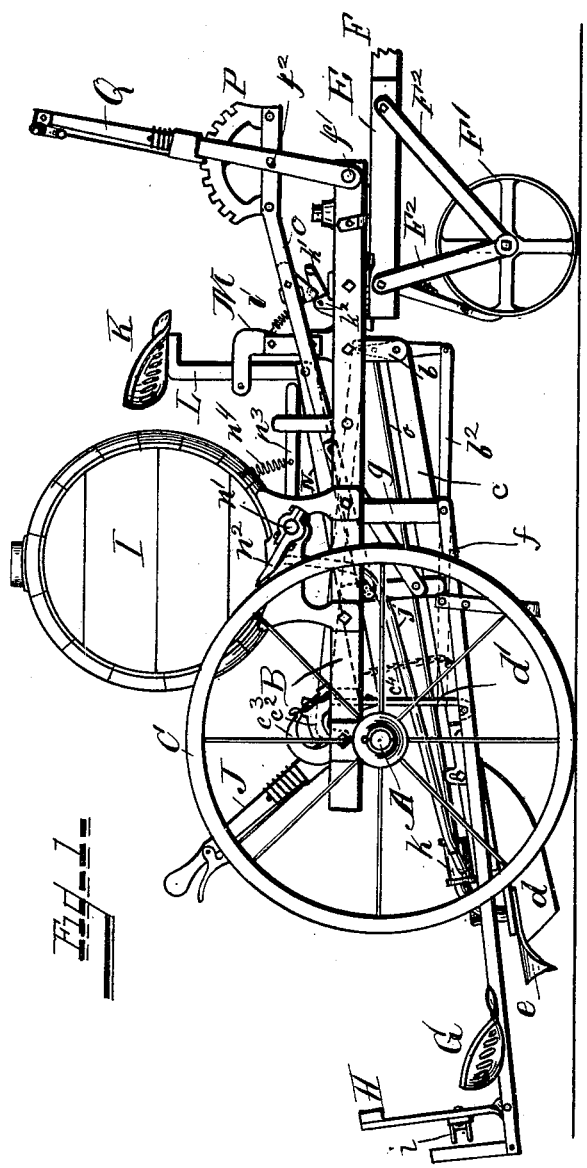
WITNESS
INVENTOR
BY
ATTORNEY

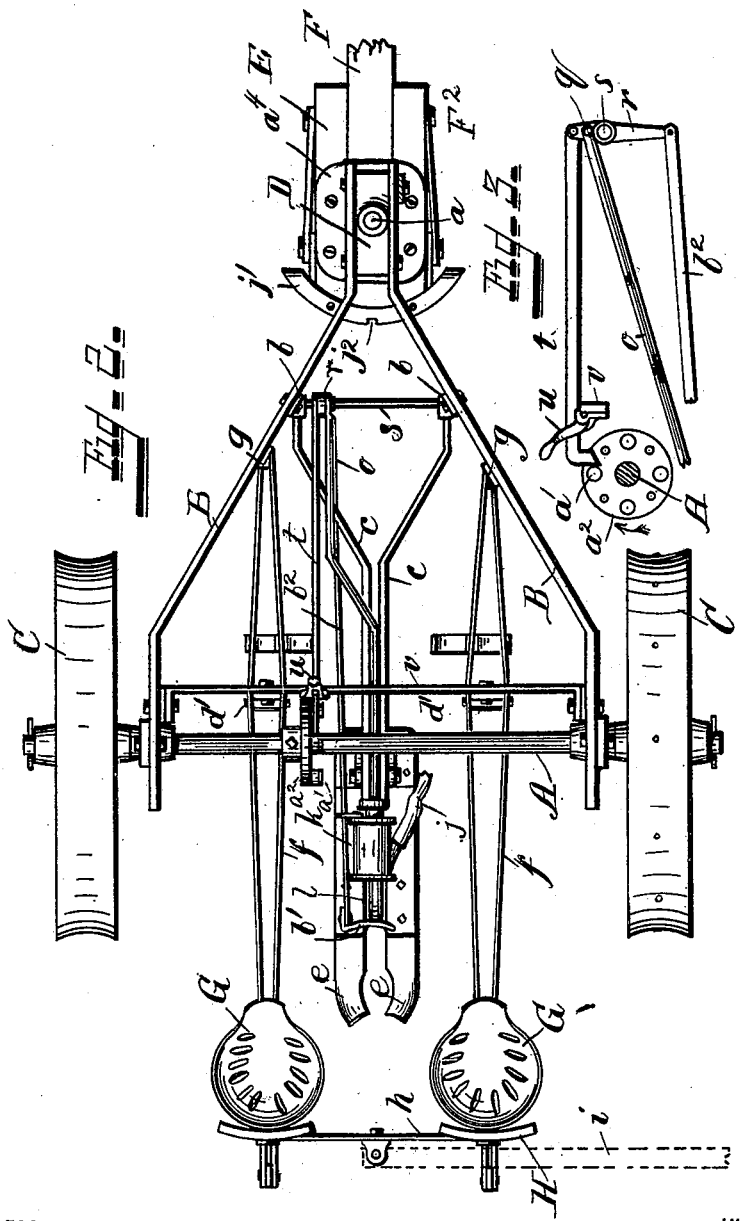

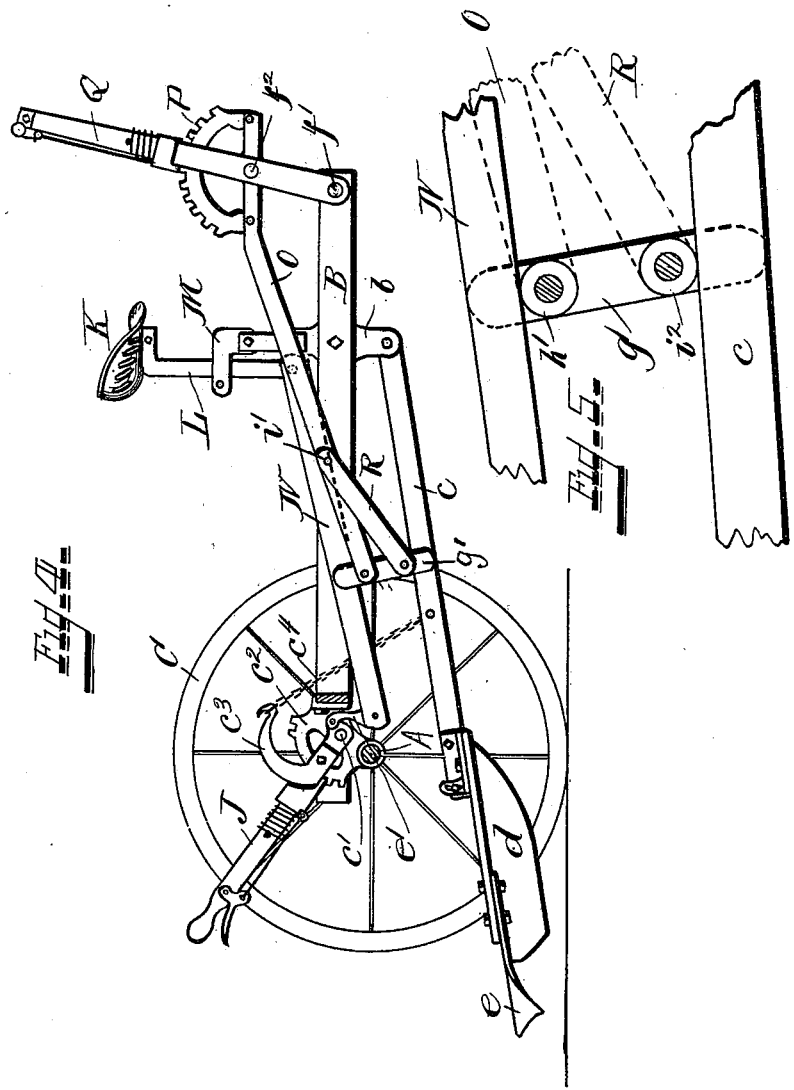

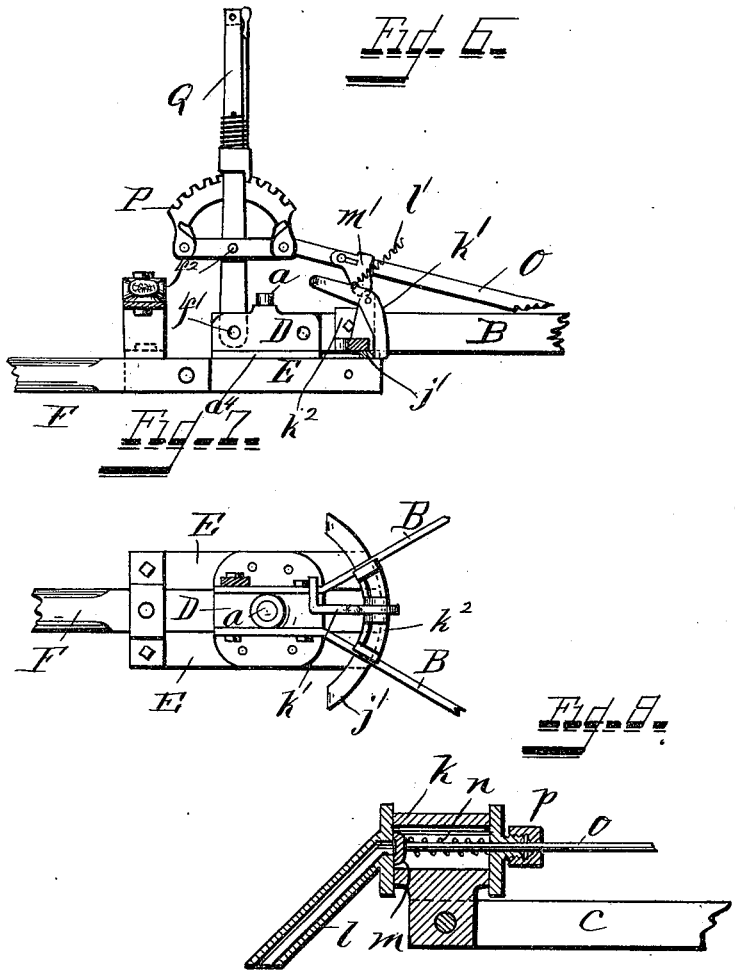

UNITED STATES PATENT OFFICE.

CHRIST MOEHRING, OF MIDDLETOWN, OHIO, ASSIGNOR TO THE McSHERRY MANUFACTURING COMPANY, OF SAME PLACE.

TRANSPLANTER.

SPECIFICATION forming part of Letters Patent No. 653,425, dated July 10, 1900.

Application filed September 18, 1899. Serial No. 730,964. (No model.)

*To all whom it may concern:*

Be it known that I, CHRIST MOEHRING, a citizen of the United States, residing at Middletown, in the county of Butler and State of Ohio, have invented certain new and useful Improvements in Transplanters, of which the following is a full, clear, and exact description, reference being had to the accompanying drawings, forming a part of this specification.

My invention relates to that class of transplanters for planting out plants which have attained their proper growth—such as tobacco, cabbage, and tomato plants—which require in addition to their being set in furrows at proper distance in the earth that they also be given a charge of water around their roots at the time of setting them into the earth, such machines generally comprising a frame on wheels carrying a furrow opener and coverer, seats for the operators who place the plants in the furrow, a water tank or barrel with suitable valve mechanism for discharging the requisite amount of water at the roots of each plant when set, and other mechanism for the convenience, ease, and manipulation of the machine in all of its operations.

The novelty of my invention will be hereinafter set forth, and specifically pointed out in the claims.

In the accompanying drawings, Figure 1, Sheet 1, is a side elevation of a transplanter embodying my invention. Fig. 2, Sheet 2, is a plan view of the machine with the water-barrel, driver's seat, and the mechanism above the main frame removed. Fig. 3, Sheet 2, is a detail side elevation of the mechanism for operating the water-valve and actuating the operator's hand by the same movement. Fig. 4, Sheet 3, is a longitudinal sectional side elevation showing the lifting and pressure-operating mechanism for the furrow opener and covering mechanism, together with their associated parts. Fig. 5, Sheet 3, is an enlarged detail elevation of the pressure-regulating mechanism. Fig. 6, Sheet 4, is a detail side elevation of the adjusting and locking mechanism for the draft-pole and caster-wheel. Fig. 7, Sheet 4, is a plan view of Fig. 6 with the hand-lever and its rack omitted. Fig. 8, Sheet 4, is an enlarged sectional side elevation of the water-valve mechanism.

The same letters of reference are used to indicate identical parts in all the figures.

Referring to Figs. 1, 2, and 4, A is the axle of the machine, supporting the main frame B and carried on supporting-wheels C, one or both of which being fast to said axle impart rotation thereto as the machine is drawn forward. The forward beams of the main frame converge and are provided with a suitable block or bearing D, to which they are secured and by which they are pivoted to a rear extension E of the tongue F by a king-bolt $a$, projecting upward from a plate $a^4$, fast on the rear end of the tongue by being secured to the pieces E, bolted to the tongue. The rear end of the tongue and the forward end of the main frame of the machine are carried on a caster-wheel F, journaled on bracket-arms $F^2$, secured to the pieces E. Pivoted to the forward part of the main frame (in this instance from hanger-brackets $b$) are the divergent ends of the drag-bars $c$, to whose rear ends are secured the furrow-opener $d$ and covering-plates $e$, of the usual or any suitable construction.

On each side of the furrow-opener are the drag-bars $f$, pivoted to the main frame, in this instance to hanger-brackets $g$, secured and pendent therefrom. Upon the rear end of the drag-bars $f$ are secured the seats G for the plant-setters, provided with backs H, extending upwardly therefrom and connected by a cross-piece $h$, to which is pivoted by a swivel connection the marker-bar $i$ after a manner well known in the art of planters.

Suitably supported upon the frame B is the barrel or water-tank I, from which a pipe or hose $j$ extends rearwardly and enters a cylinder $k$, Figs. 1, 2, and 8, secured upon the drag-bars $c$ and having a delivery-spout $l$ from its rear end, opening at the rear of the furrow-opener into the furrow made thereby and in front of the covering-plates. Within the cylinder $k$ there is a valve $m$, closing the aperture to the pipe $l$ and normally held closed by a coiled spring $n$ on a rod $o$, extending through a stuffing-box $p$ in the forward head of the cylinder and secured to the valve $m$.

The rod o at its forward end (see Fig. 3) is pivoted, as at q, to the upper end of a lever-arm r, pivoted on a cross-rod s between the hanger-brackets b. There is another arm t, pivoted to the lever r just above the rod o and which extends rearward through a slot in a cam-dog u, pivoted to a cross-bar v, which dog serves as a guide to the rear end of the rod t and also when lifted to throw the arm t upward out of engagement with pins or rollers $a'$ on a disk $a^2$, fast on the axle A. The rear end of the arm t is bent downward and beveled on one side, so that in the forward rotation of the axle A and disk $a^2$ the pins or rollers $a'$, as seen in Fig. 3, will press forward the arm t, thereby vibrating the lever r and drawing forward the rod o, which will lift the valve m from its seat and permit the contents of the cylinder k to pass out through spout l into the furrow, thereby supplying to the roots of the plant just placed in position the requisite amount of water necessary for its support and growth in starting.

The operators sitting on the seats G set the plants after the manner usual in this class of machines, and as a guide to them to know when to release the plants I have placed a hand-guide $b'$, Fig. 2, just over the rear of the spout l, which hand-guide is carried upon the rear end of a rod $b^2$, extending forward and pivoted to the lower end of the lever r, as seen in Fig. 3, the arrangement being such that when the rods t and o are pushed forward by the pins or rollers $a'$ on the disk $a^2$ the rod $b^2$ and the hand-guide will be pushed back, thus indicating to the plant-setter that the water has been discharged around the roots of the plant, whereupon he immediately releases it and the earth is covered around the roots by the covering-plates e.

In transporting the machine from place to place the cam-dog u is pressed forward, thereby lifting the rod t out of engagement with the pins or rollers $a'$ on the disk $a^2$, and should the machine be backed while at work in the field the pins or rollers $a'$, pressing against the beveled downturned end of the rod t, will automatically raise and pass the same in the manner of the backward rotation of a ratchet-wheel and ratchet, as will be readily understood.

A hand lock-lever J, Figs. 1 and 4, is pivoted, as at $c'$, to a segment-plate $c^2$, secured to the main frame, and carries a hooked extension $c^3$, from which a chain $c^4$ extends down and is secured to the drag-bars c. The segment-plate $c^2$ has locking-notches with which the bolt of the locking hand-lever J may be engaged after the same has been vibrated either to raise or lower the drag-bars c, and thereby raise and lower the furrow-opener d and covering-plates e.

The drag-bars f, which carry the plant-setters' seats, are supported on hooks $d'$, pendent from the bar V, Figs. 1 and 2.

The driver's seat K in front of the barrel I is supported on a standard L, guided in a bracket-arm M, secured to the frame of the machine, and the lower end of the standard L is pivoted to a beam N, Figs. 4 and 5, whose rear end is pivoted to a link $e'$, pivoted to a lower extension of the lever J out of line with its pivot $c'$. In front of the driver's seat and carried on a rearwardly-extending beam O is a segment-rack P, with which is engaged a hand lock-lever Q, pivoted, as at $f'$, to the main frame and also pivoted to the beam O, as at $f^2$. The rear end of the beam O carries two plates $g'$, straddling the bars N and c, the connection between the said bar O and plates $g'$ being by a pivoted roller $h'$, Fig. 5. A second bar R is pivoted to the bar O, as at $i'$, and to the lower end of the plates $g'$, which are connected at that point by an intermediate roller $i^2$, which rests upon the drag-bars c.

It will be seen from the construction last described that the weight of the driver on his seat K is transmitted to standard L, bar N, and plates $g'$ to the drag-bars c, and owing to the arrangement of the pivotal points of leverage about six times the driver's weight may be applied to force the furrow-opener into the ground, though this weight may be varied by drawing the plates $g'$ forward or forcing them backward through the medium of the hand-lever Q, acting on the bars O R, as will be readily understood, and when the plates $g'$ are adjusted at the desired point they are locked by the engagement of the hand-lever Q with its segment-rack P, as will be readily understood.

Carried upon the base portion of the tongue, on which the block D is pivoted, is a sector-plate $j'$, provided with a notch $j^2$, Fig. 2, with which a dog $k'$, Fig. 6, is pivoted on a plate $k^2$, secured between the convergent ends of the bars B of the main frame. When the machine is traveling straight forward during the operation of planting, the nose of the dog $k'$ engages the notch $j^2$ in the sector-plate $j'$, and thereby locks the tongue to the main frame, and the dog $k'$ is held in this engaged locking position by spring $l'$, attached thereto and to the guide M, as seen in Figs. 1 and 6. A cam-plate $m'$ is secured to the bar O, and when the driver comes to the end of a row in which he is to turn around he presses forward the hand-lever Q, and the plate $m'$ thereby engages the upper end of the dog $k'$ and forces its nose out of engagement with the notch in the sector-plate $j'$, thus breaking the lock and permitting the tongue to turn on the caster-wheel $f'$ to turn the machine around. As soon as the machine is turned around and the lever Q drawn back the tongue becomes again relocked in a straight line with the frame by the action of the spring $l'$ drawing the nose of the dog into the notch in the sector-plate $j'$.

In Fig. 1, $n'$ is a rock-shaft carrying at each end a scraper $n^2$ for the wheels C. Fast to the rock-shaft $n'$ is a treadle-piece $n^3$ in reach of the driver's foot and which is normally held up by spring $n^4$ to keep the scrapers $n^3$ in constant engagement with the wheels C, but which can be thrown out of such engagement by pressing upon the treadle-piece $n^3$.

Having thus fully described my invention, I claim—

1. In a transplanter, the combination of the main frame, a drag-bar pivoted thereto, a furrow-opener carried by said drag-bar, a driver's seat over the forward end of and supported in part on and connected by leverage to said drag-bar, a shiftable fulcrum between said driver's seat and drag-bar, whereby the pressure on the furrow-opener can be varied, and plant-setters' seats on each side of and in the rear of the furrow-opener, substantially as described.

2. In a transplanter, the combination of the main frame, a drag-bar pivoted thereto, a furrow-opener carried by said drag-bar, a driver's seat supported in part on said drag-bar, a shiftable fulcrum between said driver's seat and drag-bar, and a hand lock-lever within reach of the driver's seat for shifting and locking said shiftable fulcrum, whereby the pressure on the furrow-opener can be varied, substantially as described.

3. In a transplanter, the combination of the main frame, a drag-bar pivoted thereto, a furrow-opener carried by said drag-bar, a driver's seat supported in part on said drag-bar, a shiftable fulcrum between said driver's seat and drag-bar, a caster-wheel connected to, and turning with the tongue of the machine, a locking-dog between the main frame and the tongue of the machine, a connection between said shiftable fulcrum and locking-dog, and a hand lock-lever within reach of the driver's seat for shifting and locking said shiftable fulcrum and throwing said locking-dog out of engagement with the tongue, substantially as described.

4. In a transplanter, the combination of the main frame, a drag-bar pivoted thereto, a furrow-opener carried by said drag-bar, an axle for the main frame rotated by the forward movement of the machine, a disk on said axle provided with studs or pins, a water-tank on the main frame having a discharge-cylinder adjacent to the furrow-opener, a valve in said discharge-cylinder, lever mechanism between said valve and the disk on the axle of the machine, and a hand-pusher in the rear of said cylinder and connected to said lever mechanism, whereby at predetermined intervals, during the rotation of the axle, the valve is opened to discharge water into the furrow, and the hand-pusher is actuated, substantially as described.

5. In a transplanter, the combination of the drag-bar $c$ carrying the furrow-opener $d$ and pivoted to the main frame, the bar N pivoted at its rear end to a hand lock-lever J, a lifting connection between said hand lock-lever and the drag-bar, the driver's seat supported on the bar N, the bar O carrying a locking-segment and the shiftable fulcrum $g'$, and the hand lock-lever Q pivoted to the main frame and to the bar O concentric with the segment-rack thereof, substantially as described.

6. In a transplanter, the combination and arrangement of the drag-bar $c$ carrying the furrow-opener $d$ and pivoted to the main frame, a water-tank carried by the main frame, a cylinder carried by the furrow-opener and drag-bar and connected to the water-tank, a discharge-valve in said cylinder for depositing water in the furrow, the disk $a^2$ provided with pins $a'$ on the rotating axle of the machine, the dog-rod $t$ coacting with said pins, the lever $r$, to which said dog-rod is pivoted, the rod $o$ likewise pivoted to the lever $r$ and connected to the valve in the cylinder, the hand-pusher $b'$ in rear of the cylinder, and the rod $b^2$ connecting said hand-pusher and the lever $r$, substantially as, and for the purpose specified.

7. In a transplanter of the character described, the combination and arrangement of the rotating disk $a^2$ provided with pins $a'$, the dog-rod $t$ pivoted at one end to a lever $r$, and guided at its end next to the disk in a lifting-dog $u$ pivoted to a fixed part of the frame, the valve-rod $o$ pivoted to the lever $r$, and the hand-pusher rod $b^2$ likewise pivoted to the lever $r$, substantially in the manner, and for the purpose specified.

CHRIST MOEHRING.

Witnesses:
B. HARWITZ,
W. G. PALMER.